Aug. 31, 1954 J. J. BURRIS Re. 23,860

KEY SEAT WIPER

Original Filed May 15, 1948

Inventor
Joseph J. Burris

By
E. V. Hardway
attorney.

Reissued Aug. 31, 1954 Re. 23,860

UNITED STATES PATENT OFFICE 23,860

KEY SEAT WIPER

Joseph J. Burris, Livingston, Tex.

Original No. 2,620,164, dated December 2, 1952, Serial No. 27,198, May 15, 1948. Application for reissue May 11, 1953, Serial No. 354,440

15 Claims. (Cl. 255—27)

Matter enclosed in heavy brackets [ ] appears in the original patent but forms no part of this reissue specification; matter printed in italics indicates the additions made by reissue.

This invention relates to a key seat wiper.

The invention embodies certain improvements over that type of tool described in applicant's copending application filed March 26, 1946, under Serial No. 657,267, now Patent No. 2,501,025, issued March 21, 1950.

An object of the present invention is to incorporate into the tool reaming blades whereby the hole may be reamed and the tool, when it becomes stuck, can be subjected to jarring action to release it for withdrawal.

In drilling wells, particularly deep wells, by the rotary drilling process wherein the drill is driven by a drill stem extending to the ground surface the drill stem, particularly in bores that are not straight, often wears a groove in the side wall of the bore of less diameter than the diameter of the drill collar and when it is attempted to pull the drill stem and drill from the bore, as must often be done, the drill stem will follow said key seat, or wall groove, and the drill collar will become stuck therein, so that it is very difficult, and sometimes impossible, to withdraw the drill from the bore.

It is another object of the present invention to provide means for enlarging, or "wiping" said groove, or key seat, so that the drill collar and drill will readily pass upwardly therethrough when it is attempted to withdraw the drill.

It is a further object of the present invention to provide a device of the character described including the combination with the drill stem of an impact member which is slidably mounted thereon and which is rotatable therewith with reaming blades thereon, together with impact faces spaced apart on opposite sides of said impact member provided for the purpose of jarring the impact member loose, by the reciprocation of the stem, should it become stuck in the groove, or key seat.

The impact member may be mounted at any selected location on the drill stem and when located between the drill and the drill collar, that is immediately above the drill, it acts as a stabilizer and also makes it possible to ream upwardly to free the drill in case it should become stuck.

It is a still further object of the present invention to provide a tool of the character described wherein the drill stem is provided with a break out joint located within the impact member so that the drill stem may be separated and withdrawn and thereafter a fishing tool lowered and engaged with the impact member to withdraw said impact member which is too large to be washed over and thereafter a washing string of pipe may be lowered over the remaining equipment in the usual way to wash the same loose and thereupon the washing string may be removed and a fishing tool lowered on a string and engaged with the upper end of said remaining equipment to remove it from the bore.

Other objects and advantages will be apparent from the following specification which is illustrated by the accompanying drawings, wherein.

Figure 1:
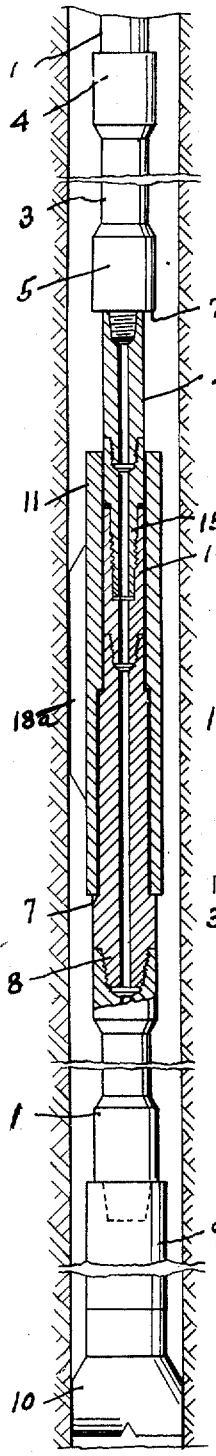
Figure 1 is an elevational view of the tool shown partly in section and connected into the drill stem above the drill collar.
Figure 2:
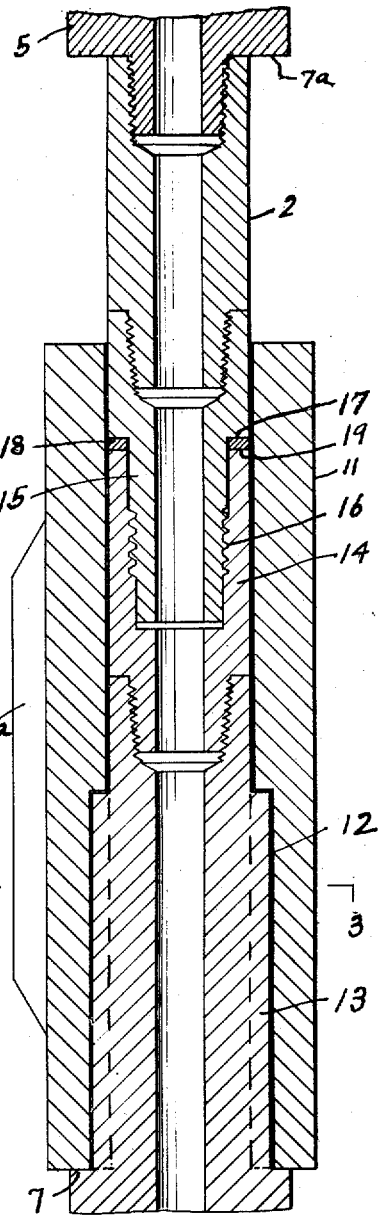
Figure 2 is an enlarged, fragmentary, vertical sectional view.

Referring now more particularly to the drawings wherein like numerals of reference designate the same parts in each of the figures, the numeral 1 designates a conventional drill stem having a reduced tubular section 2 which is connected with the stem above the tubular section 3. The upper end of the section 3 if formed with an enlarged coupling member 4 for connection with the drill stem above and whose lower end is formed with an enlarged coupling member 5 for connection to the upper end of the tubular section 2 as shown in Figure 1.

The lower end of the section 2 is outwardly enlarged forming an upwardly facing, annular, impact face 7 and said enlarged lower end is also formed with a tapering, externally threaded pin 8 adapted to be screwed into the upper end of a section of the drill stem beneath or to the drill collar 9 to the lower end of which the drill 10 is connected.

Mounted on the tubular section 2 there is a tubular, relatively heavy, impact member 11 whose lower end is provided with internal longitudinal keyways 12 and the lower end of the tubular section 2 adjacent and above the impact face 7 is provided with longitudinal keys, or splines 13 which work in said keyways. These keys and keyways are of such length that they will remain in mesh with the impact member 11 in its upper position that is when its upper end is in contact with the lower end face 7a of the coupling member 5 so that the impact member is at all times rotatable with the drill stem.

Incorporated into the tubular section 2 of the drill stem there is what is commonly known as a safety joint which comprises a tubular female member 14 and above it a tubular male member 15. These members may be connected together by coarse intermeshing threads 16.

In the illustration shown the upper end of the male member 15 is enlarged forming an external annular downwardly facing shoulder 17 and between this shoulder and the opposing end of the female member 14 there may be inserted an annular washer 18 whose upper end under surfaces 19 may be serrated or roughened so that the male member cannot be screwed too tightly into the female member. This connection is located within the impact member 11.

If for any reason it should be desired to remove the drill stem it may be turned to the left and this safety joint is formed as above described so that it will break easier than any of the other joints of the drill stem to the end that said drill stem may be detached and removed as will become necessary under certain conditions.

Figure 4:
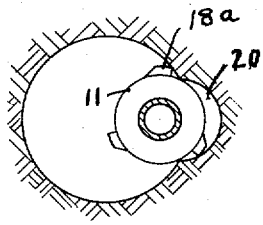
Figure 4 is a horizontal, sectional view illustrating an enlarged cross-sectional view of the bore hole formed with a key seat and showing the tool located therein.
Figure 3:
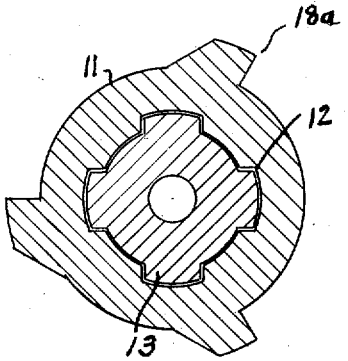
Figure 3 is a cross-sectional view taken on the line 3—3 of Figure 2.

The impact member 11 may also be formed with external, radially extended longitudinal reaming b'ades, as 18a, three of these blades being shown in Figures 3 and 4.

In drilling the well should the bore become crooked, or curved, the drill stem will bear against the inside of the curve and form a groove 20 in the sidewall of the bore, commonly known as a key seat and this key seat may be formed in the wall of the bore some distances above the drill collar or the impact member 11.

In the form shown in Figure 4 the drilled hole is shown as having become enlarged to a large transverse diameter as sometimes happens depending on the formation of the stratum being drilled.

In lowering the drill stem in the well bore or in elevating the same the key seat may be enlarged by the reamer blades upon rotation of the drill stem thus providing for the free passage of the drill collar when it is desired to withdraw the drill stem from the bore.

Should the impact member 11 become stuck in the key seat the drill stem may be reciprocated to allow movement of the impact faces 7, 7a into contact with the opposing ends of the impact member 11 to jar the same loose and this operation may be repeated until the key seat or groove 20 is worn away or enlarged until the drill collar and drill may be readily removed therethrough. If however this cannot be done the drill stem may be then turned to the left and the safety joint hereinabove described broken out and the drill stem removed.

The impact member is of a size such that it cannot be washed over, practically, so selected fishing tool may be lowered and the impact member thereby independently removed and thereafter a washing string of pipe may be lowered and a washing fluid may be forced down through said pipe around the remaining equipment in the usual way to wash the same loose and said washing string may then be removed and a fishing tool lowered on a string into the well bore and engaged into the upper end of the female member 14 and the remaining equipment below then withdrawn from the well bore.

If it be desired to do so the key seat wiper may be incorporated into the drill stem between the drill 10 and the drill collar 9 above and the drilling equipment operated in the manner hereinabove explained. In such event, however, should the drill become stuck in the well bore so that it cannot be pulled out the drill stem may be broken at the safety joint as before and the drill stem and drill collar withdrawn leaving the drill and impact member at the bottom of the bore to be fished out.

The drawings and description are merely illustrative and it is not intended to limit the invention to the precise form shown and described while the broad principle of the invention will be defined by the appended claims.

What I claim is:

1. Well drilling equipment comprising, a drill stem, upper and lower impact faces on the drill stem, an elongated impact member mounted to move longitudinally on the drill stem between said faces, said drill stem having a safety joint within the impact member whereby the stem may be separated.

2. Well drilling equipment comprising, a drill stem, upper and lower impact faces on the drill stem, an impact member mounted on the stem between said faces and movable independently of the stem, into contact with either of said faces and a safety joint incorporated into the stem between said impact faces and within the impact member whereby the stem may be separated, interengaging means on said stem and impact member holding the stem and impact member against relative rotation in all positions of the impact member on the stem, said means being disengageable upon separation of said safety joint and removal of the stem above said joint to permit upward removal of said impact member from said stem below said joint.

3. Well drilling equipment comprising, a drill stem, upper and lower impact faces on the drill stem, an elongated impact member mounted on the stem between said faces and movable independently of the stem, into contact with either of said faces, a safety joint incorporated into the stem and confined within the impact member whereby the stem may be separated and reamers on the impact member.

4. Well drilling equipment comprising, a drill stem which is formed of sections fixed against longitudinal movement relative to each other, upper and lower impact faces on the drill stem, a sleeve like impact member mounted on the stem between said faces and movable independently of the stem into contact with either of said faces, a safety joint incorporated into the stem and connecting said sections and located within the impact member whereby said stem may be separated.

5. Well drilling equipment comprising, a drill stem which is formed of sections fixed against longitudinal movement relative to each other, upper and lower impact faces on the drill stem, a sleeve like impact member mounted on the stem between said faces and movable independently of the stem into contact with either of said faces, a safety joint incorporated into the stem and connecting said sections and located within the impact member whereby said stem may be separated and reamers on the impact member.

6. Well drilling equipment comprising, a drill stem, upper and lower impact faces on the stem, an impact member mounted to work longitudinally on the drill stem between said faces, said drill stem having a safety joint within the impact member whereby the stem may be separated between said impact faces and the upper section of the stem and the upper impact face removed to allow the independent removal of the impact member.

7. Well drilling equipment comprising, a drill stem, upper and lower impact faces on the drill stem, an impact member mounted to move longitudinally on the drill stem between said faces, a safety joint in said drill stem between said faces and within the impact member, longitudinal grooves on the interior of the lower portion of the impact member, projections on the drill stem below the safety joint extending into said grooves to hold said impact member and stem against relative rotation, the upper edges of the projections engaging the upper ends of the grooves to limit downward movement of the impact member on the stem, but permitting disengagement of the impact member from the stem on upward movement thereof.

*8. Well drilling equipment comprising, a drill stem, upper and lower impact faces on the drill stem, an impact member mounted on the stem between said faces and movable independently of the stem, into contact with either of said faces and separable joint means incorporated into the stem between said impact faces and within the impact member whereby the stem may be separated, interengaging means on said stem and impact member holding the stem and impact member against relative rotation in all positions of the impact member on the stem, said means being disengageable upon separation of said joint means and removal of the stem above said joint means to permit upward removal of said impact member from said stem below said joint.*

*9. Well drilling equipment comprising, a drill stem, upper and lower impact faces on the drill stem, an elongated impact member mounted on the stem between said faces and movable independently of the stem, into contact with either of said faces, separable joint means incorporated into the stem and confined within the impact member whereby the stem may be separated, and reamers on the impact member.*

*10. Well drilling equipment comprising, a drill stem which is formed of sections fixed against longitudinal movement relative to each other, upper and lower impact faces on the drill stem, a sleeve like impact member mounted on the stem between said faces and movable independently of the stem into contact with either of said faces, separable joint means incorporated into the stem and connecting said sections and located within the impact member whereby said stem may be separated, and reamers on the impact member.*

*11. Well drilling equipment comprising, a drill stem, upper and lower impact faces on the stem, an impact member mounted to work longitudinally on the drill stem between said faces, said drill stem having separable joint means within the impact member whereby the stem may be separated between said impact faces and the upper section of the stem and the upper impact face removed to allow the independent removal of the impact member.*

*12. Well drilling equipment comprising, a drill stem, upper and lower impact faces on the drill stem, an impact member mounted to move longitudinally on the drill stem between said faces, separable joint means incorporated into said drill steam between said faces and within the impact member, longitudinal grooves on the interior of the lower portion of the impact member, projections on the drill stem below the joint means extending into said grooves to hold said impact member and stem against relative rotation, the upper edges of the projections engaging the upper ends of the grooves to limit downward movement of the impact member on the stem, but permitting disengagement of the impact member from the stem on upward movement thereof.*

*13. Well drilling equipment comprising an upper drill stem section having a downwardly facing impact face, a lower drill stem section having an upwardly facing impact face, one of said sections having an externally threaded male end portion extending beyond the impact face thereof and the other of said sections having an internally threaded female end portion extending beyond the impact face thereof, said end portions being threadably engageable to releasably connect said sections with said impact surfaces in spaced opposed relation, an impact member surrounding said portions and movable independently of the stem into contact with either of said faces.*

*14. Well drilling equipment comprising, a drill stem which is formed in sections fixed against longitudinal movement relative to each other, upper and lower impact faces on the drill stem, a sleeve like impact member mounted on the stem between said faces and movable independently of the stem into contact with either of said faces, two of said drill stem sections having adjoining ends located within said impact member and interengageable joint means on said ends whereby said ends may be separated.*

*15. Well drilling equipment comprising a drill stem which is formed in sections fixed against longitudinal movement relative to each other, upper and lower impact faces on the drill stem, a sleeve like impact member mounted on the stem between said faces and movable independently of the stem into contact with either of said faces, two of said drill stem sections having adjoining ends located within said impact member, one of said ends being provided with an externally threaded male portion and the other of said ends being provided with an internally threaded female portion, said portions being threadably engageable to releasably connect said ends.*

References Cited in the file of this patent or the original patent

UNITED STATES PATENTS

| Number | Name | Date |
|---|---|---|
| 1,370,492 | Smith et al. | Mar. 1, 1921 |
| 1,509,350 | Gianella | Sept. 23, 1924 |
| 1,671,458 | Wilson | May 29, 1928 |
| 1,745,351 | Bishop | Feb. 4, 1930 |
| 1,897,267 | Mecom | Feb. 14, 1933 |
| 1,983,545 | Johnson | Dec. 11, 1934 |
| 2,026,931 | Burns et al. | Jan. 7, 1936 |
| 2,049,289 | Burns et al. | July 28, 1936 |
| 2,072,320 | Thomas | Mar. 2, 1937 |
| 2,074,608 | Gosline | Mar. 23, 1937 |
| 2,212,067 | Hoffoss | Aug. 20, 1940 |
| 2,463,353 | Brown et al. | Mar. 1, 1949 |
| 2,501,025 | Burris | Mar. 21, 1950 |
| 2,572,307 | Brown et al. | Oct. 23, 1951 |

OTHER REFERENCES

"New Rotary Tool Is Used To Keep Drill Pipe Free," by K. Marshall Fagin, Petroleum Engineer, vol. 18, October 1946, pages 272, 274, and 276.